United States Patent [19]
Li et al.

[11] Patent Number: 6,133,975
[45] Date of Patent: *Oct. 17, 2000

[54] BISTABLE LIQUID CRYSTAL DISPLAY DEVICE USING POLYMER STABILIZATION

[75] Inventors: Jianlin Li, Plano, Tex.; Philip J. Bos, Hudson, Ohio

[73] Assignee: Kent State University, Kent, Ohio

[ * ] Notice: This patent is subject to a terminal disclaimer.

[21] Appl. No.: 08/852,276

[22] Filed: May 7, 1997

Related U.S. Application Data

[60] Provisional application No. 60/017,541, May 10, 1996.

[51] Int. Cl.⁷ .................................................. G02F 1/1333
[52] U.S. Cl. .............................. 349/134; 349/88; 349/156
[58] Field of Search ..................................... 349/134, 135, 349/133, 125, 156, 88

[56] References Cited

U.S. PATENT DOCUMENTS

| | | | |
|---|---|---|---|
| 4,101,207 | 7/1978 | Taylor | 350/344 |
| 4,664,480 | 5/1987 | Geary et al. | 350/350 |
| 5,453,863 | 9/1995 | West et al. | 359/91 |
| 5,812,230 | 9/1998 | Sakaigawa | 349/166 |
| 5,831,700 | 11/1998 | Li et al. | 349/88 |

OTHER PUBLICATIONS

"Fast and Bistable Electro–Optic Displays Using Ferroelectric Liquid Crystals", by N.A. Clark, S. T. Lagerwall, and J. Wahl, no date or publication.

"Linear electro–optic effects in polymer–dispersed ferroelectric liquid crystals", Appl. Phys. Lett. 60(25), Jun. 22, 1992, by Kitzerow, Molsen and Heppke, pp. 3093–3095.

"Polymer dispersed nematic liquid crystal for large area displays and light valves", J. Appl. Phys. 60(6), Sep. 15, 1986, by Drzaic, pp. 2142–2148.

"Polymer Encapsulated Nematic Liquid Crystals for Display and Light Control Applications", SID 85 Digest, by Fergason, pp. 68–70, No date.

"Morphological control in polymer–dispersed liquid crystal film matrices",Proc. SPIE, vol. 1080, 24 (1989), by Yamagishi, Miller, and van Ast.

*Primary Examiner*—Robert H. Kim
*Assistant Examiner*—Andrew H. Lee
*Attorney, Agent, or Firm*—Renner, Kenner, Greive, Bobak, Taylor & Weber

[57] ABSTRACT

A liquid crystal display device including a polyimide alignment layer, having a bistable liquid crystal material and a polymer stabilizer in an amount effective to stabilize the liquid crystal, preferably about 2 weight percent, associated with the liquid crystal material, the liquid crystal having a low pretilt angle, to eliminate stripe tendency and to increase hysteresis. The device has a low driving voltage, low power consumption and fast switching.

12 Claims, 3 Drawing Sheets

BISTABLE LIQUID CRYSTAL DISPLAY DEVICE USING POLYMER STABILIZATION

CROSS-REFERENCE TO RELATED APPLICATIONS

This application claims priority from U.S. Provisional Patent Application 60/017,541, filed on May 10,1996.

GOVERNMENT RIGHTS IN THE INVENTION

The United States government has a paid-up license in this invention and may have the right in limited circumstances to require the patent owner to license others on reasonable terms as provided for by the terms of contract DMR 89-20147, awarded by the National Science Foundation.

TECHNICAL FIELD

The present invention relates generally to liquid crystalline light modulating devices, and more specifically to polymer stabilized bistable liquid crystalline devices which eliminate stripe tendency and increase hysteresis in their displays.

BACKGROUND OF THE INVENTION

Several applications of nematic liquid crystal devices have been reported that utilize bistability. This feature is important, since it provides a pronounced memory of the last imprinted ON-OFF state to the resulting display, in the absence of any field.

However, a characteristic of certain of these bistable devices is that a high pretilt angle is required in order to avoid stripe formation. As a result, the devices were constructed using evaporated SiO as the alignment layers. Such a procedure, however, is an elaborate and expensive process.

A more economical approach to liquid crystal device fabrication is the use of polyimide alignment layers. However, stripe formation in the resulting display is always a concern when using standard polyimide alignment layers. It would be desirable, therefore, to provide a liquid crystal device containing liquid crystal material exhibiting bistability which is capable of being economically fabricated, while avoiding stripe formation.

SUMMARY OF THE INVENTION

It is an object of the present invention to provide a bistable liquid crystal device which requires only low driving voltage and exhibits fast switching.

It is a further object of the present invention to provide a bistable liquid crystal device which eliminates stripe tendency and increases hysteresis.

It is a further object of the present invention to provide a bistable liquid crystal device which avoids the necessity for a high pretilt angle and the use of evaporated SiO as the alignment layer.

These and other objects of the invention are accomplished by the invention as hereinafter described and claimed.

The present invention provides a liquid crystal display device including a polyimide alignment layer, having a bistable liquid crystal material, the liquid crystal having a low pretilt angle, and a polymer stabilizer in an amount effective to stabilize the liquid crystal associated with the liquid crystal material. The polymer is cured to form polymer networks, such as at a high-field condition, to effectively eliminate stripe tendency and to increase hysteresis. The device has a low driving voltage, low power consumption and enables fast switching.

BRIEF DESCRIPTION OF THE DRAWINGS

FIG. 2 (*b*) is a graph of director configurations (polar angle) showing the hysteresis of a 360° twist nematic cell, in which the applied voltage decreases from 5 V to 0 V.

FIG. 3 (*b*) is a microphotograph of the inventive matrix device showing the picture (white) when no field is applied (black dots are spacers) taken through a pair of crossed polarizers (45° with rubbing direction).

FIG. 4 (*b*) is a microphotograph taken through a pair of crossed polarizers (45° with rubbing direction) 5 seconds after a zero volt pulse (25 ms) was applied, showing the picture (white) of an applied 2.1 volts holding voltage.

DESCRIPTION OF PREFERRED EMBODIMENTS

The liquid crystal display device of the present invention includes a polyimide alignment layer, and contains a bistable liquid crystal material and a polymer stabilizer in an amount effective to stabilize the liquid crystal associated with the liquid crystal material.

The liquid crystal material is a chiral nematic liquid crystal, including chiral material in an amount effective to form a twist angle of 360°. Suitable liquid crystals include those conventionally used in super twist nematic (STN) displays. According to the present invention, the liquid crystal material has a low surface pretilt angle in the liquid crystal device, preferably about 5°.

The polymer stabilizer stabilizes the state of the liquid crystal in the absence of an applied field, and permits the liquid crystal to change states in the presence of an applied field.

It is present in an amount of from about 1 % to about 5 %, preferably about 1 % to about 4 %, based on the total weight of polymer and liquid crystal material. The polymer stabilizer is preferably a polymerizable monomer that dissolves into and is aligned with the liquid crystal, and is preferably a UV curable acrylate, such as a diacrylate.

The polyimide alignment layers are preferably antiparallelly rubbed on opposing substrates. The transparent substrates may be glass or plastic. The chiral nematic liquid crystal display device has a cell thickness to pitch ratio of greater than or equal to about 0.75 to less than or equal to about 1.25, preferably about 0.88.

EXAMPLE

A 7 microns thick, 80 dpi 160×160 matrix display was constructed by the following procedure. The device was constructed using two pieces of indium tin oxide (ITO) coated glass substrates having an antiparallelly rubbed Nissan SE-610 polyimide coating. Seven (7) micron glass fiber spacers were used to maintain the glass substrates in a spaced apart relationship and form the cell. The liquid crystal material that was to be introduced into the cell was ZLI-1694, with a chiral additive, CB15 from E. Merck. The d/p ratio was 0.88, so the pitch was 7.95 microns. A two (2) weight percent photocurable diacrylate monomer, Desolite 2002-33 available from DSM Desotech Co., was added to the liquid crystal mixture before it was degassed, vacuum filled, squeezed and sealed. The device was then exposed to UV light for approximately 10 minutes (3 mw/cm2) with a voltage of 15 V applied to it.

Figure 1:
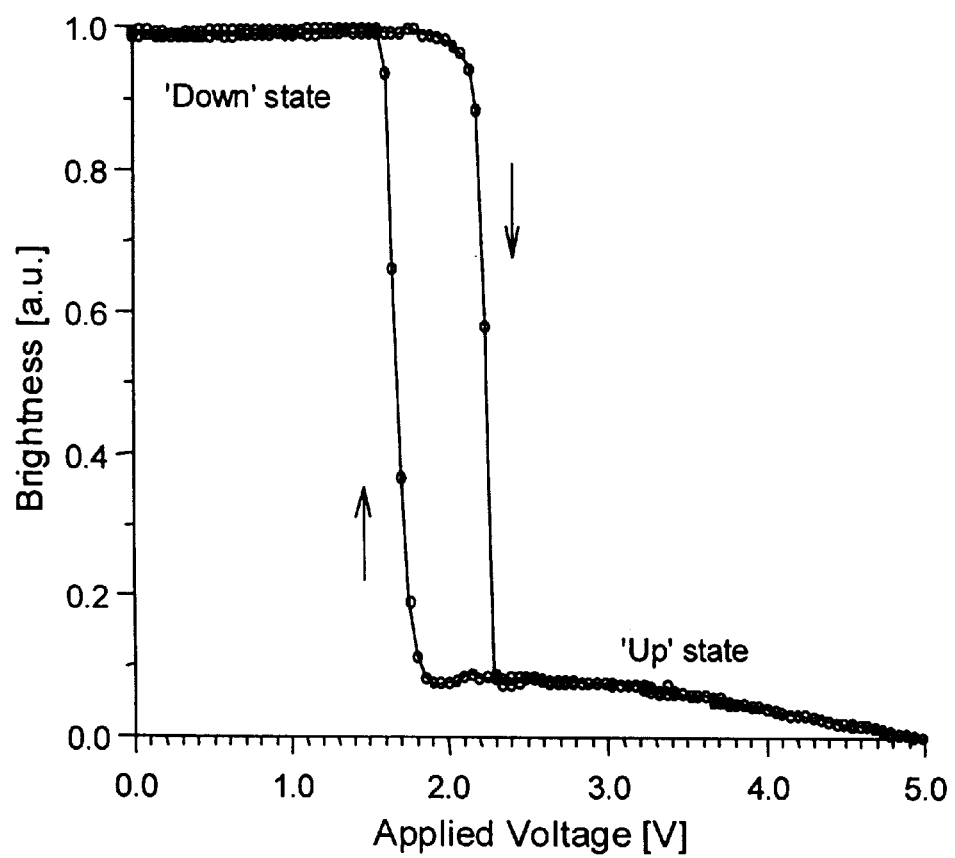
FIG. 1 is an electro-optic curve showing hysteresis for the polymer stabilized bistable display, plotting brightness versus applied voltage.

The polymer stabilized liquid crystal display cell produced in the above Example was analyzed for hysteresis by comparing display brightness at various applied voltages. FIG. 1 shows the electro-optic curve that was taken with the cell between a pair of crossed polarizers. When a holding voltage of V(subH) equal to 2.1 volts was applied to a pixel, the pixel stayed at black (normal white mode) after a short pulse of 2 V(subH) (effective voltage is 4.2 volts) was applied, the pixel stayed at white after a short pulse of V(sub H) (effective voltage is zero volts) was applied. The total ramp time was 5 minutes.

This device had very sharp thresholds and the voltage windows for hysteresis was large enough for an easy holding voltage selection and small enough for easy addressing (2:1 addressing was used in this case). The device could be switched between black and white and stayed that way with 4.2 volts or zero volts pulses applied.

The switching time for the on and off states are not the same for the inventive matrix device due to the presence of polymer network, as for the device without polymer stabilization. The switch on time is about 7 ms and switch off time is about 25 ms.

The mechanism behind the bistability of this type of device can be explained by 'up' and 'down' states of the mid-plane tilt. When a high electric pulse is applied to the cell and then drops to the holding voltage, the mid-plane director tilt angle is almost perpendicular to the surface. This is the 'up' state. When a zero field pulse is applied to the cell and then stays at holding voltage, the mid-plane director tilt angle is almost parallel to the surface. This is the 'down' state.

In FIG. 2 (a) and (b), the tilt angles across the cell as a function of applied voltage are plotted for two different situations. One is for the increasing applied voltage case, FIG. 2 (a): and the other is for the decreasing applied voltage case, FIG. 2 (b).

By changing the applied voltage from 0 V to 5 V with 0.1 V increments, the director configurations were obtained for each voltage and the system free energy density was calculated as well as the elastic energy density for that voltage. The same process was then repeated for applied voltage from 5 V to 0 V.

The material constants for the liquid crystal ZLI-1694 were used for the analysis. The surface condition was assumed as hard anchoring which is commonly used in display modeling programs. The twist angle and the surface pretilt angle of the cell were 360° and 5°, respectively. The thickness to pitch ratio was 0.88. The simulation was done by minimizing the Frank free energy using a numerical dynamic relaxation technique.

Figure 2A:
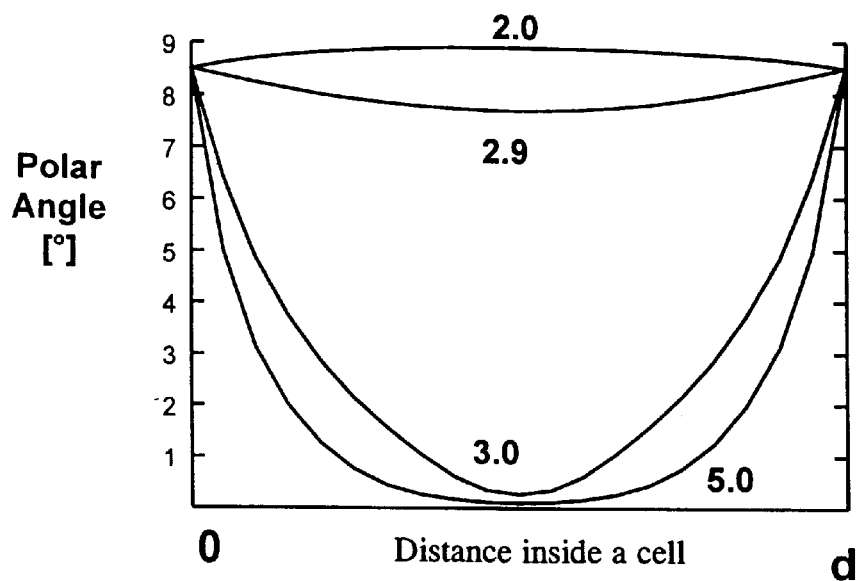
FIG. 2 (*a*) is a graph of director configurations (polar angle) showing the hysteresis of a 360° twist nematic cell, in which the applied voltage increases from 0 V to 5 V.
Figure 2B:
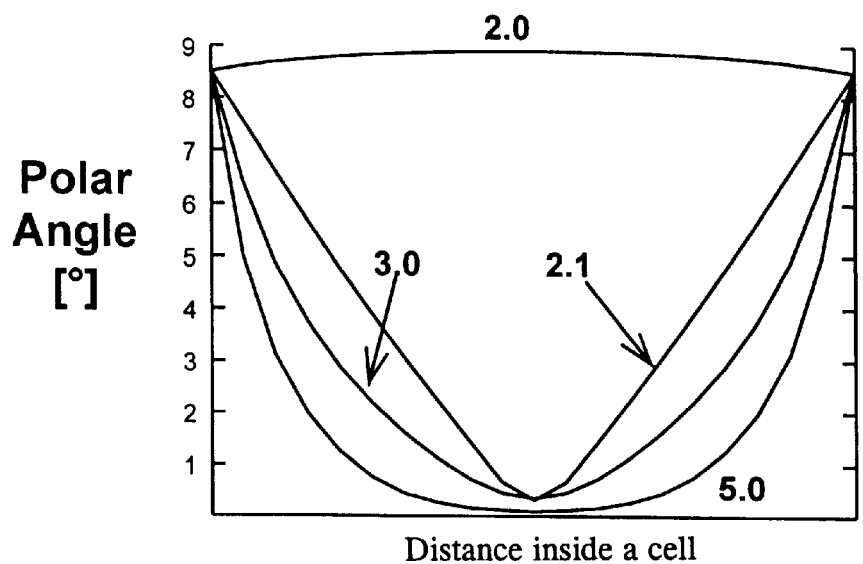

The obtained director configurations are plotted in FIGS. 2(a) and 2(b) respectively. In the applied voltage region of 2.1 V to 2.9 V, the director configuration for a given value has two different shapes depending on the initial condition. When the applied voltage is increased from 0 V to less to 2.9 V, the director configurations are almost identical with the mid-plane tilt angle parallel to the surface; when the applied voltage reaches 3.0 V, the effect of applied electric field causes the director configuration to have a significantly different shape than that of 2.9 V, with the mid-plane tilt angle at almost perpendicular to the substrate surface.

On the other hand, when the applied field is decreased from 5.0 V, the mid plane tilt angle stays perpendicular to the surface until the applied voltage drops down to 2.0 V. During the process, the magnitude of the polar angle gradient has the largest value at the surface and becomes smaller gradually to mid-cell. At 2.1 V, the gradient throughout the cell has the same magnitude except at the mid-cell where it is still zero. The optical effect of hysteresis of the director configurations is that the display could be bright or dark in between a pair of crossed polarizers depending on different initial voltages.

Within the bistable range, from FIG. 2(a) and 2(b), the energy for the mid-plane tilt angle to stay at parallel to the surfaces is lower than the mid-plane tilt angle to stay at perpendicular to surfaces, which generates significantly more strain energy. In other words, the 'down' state is the preferred state after the device has been held for a long time. The matrix device was viewed after it had been held at VH for up to five minutes (the limit of driving equipment). For the 'down' state hold, there was no 'up' state growth after five minutes hold. For the 'up' state hold, the down state area increased slowly from the walls and spacers. After five minutes hold, the pixels were 80% 'up' state area and 20% 'down' state.

Figure 3A:
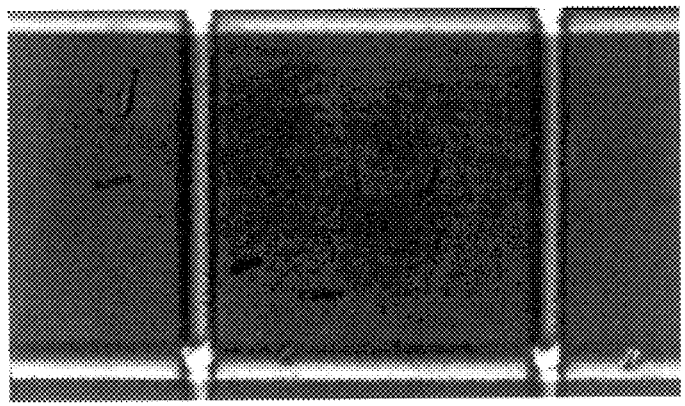
FIG. 3 (*a*) is a microphotograph of the inventive matrix device showing the picture (black) of 4.2 volts applied, taken through a pair of crossed polarizers (45° with rubbing direction).
Figure 3B:
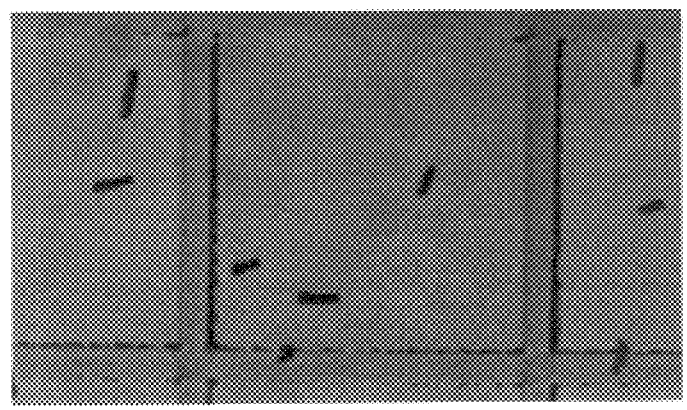

In FIGS. 3 (a) and (b), microphotographs of the matrix device are shown, taken through a pair of crossed polarizers (45° with rubbing direction). FIG. 3 (a) shows the picture of 2 VH applied voltage that is black between a pair of polarizers (4.2 volts applied). The grids are the area where the ITO was etched out. FIG. 3 (b) shows the picture of no field is applied which is white (black dots are spacers).

Figure 4A:
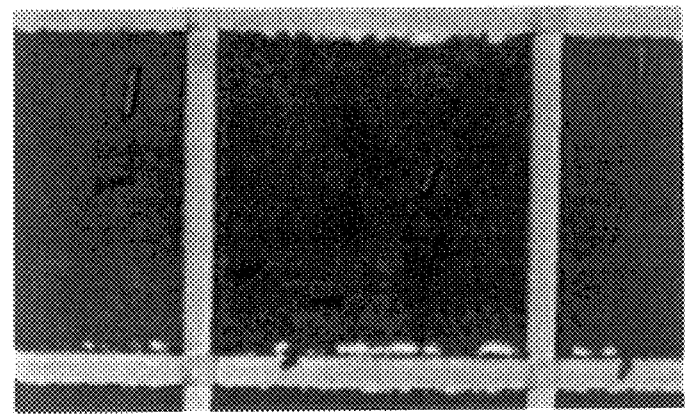
FIG. 4 (*a*) is a microphotograph taken through a pair of crossed polarizers (45° with rubbing direction) 5 seconds after a 4.2 volts pulse (7 ms) was applied, showing the picture (black) of an applied 2.1 volts holding voltage.
Figure 4B:
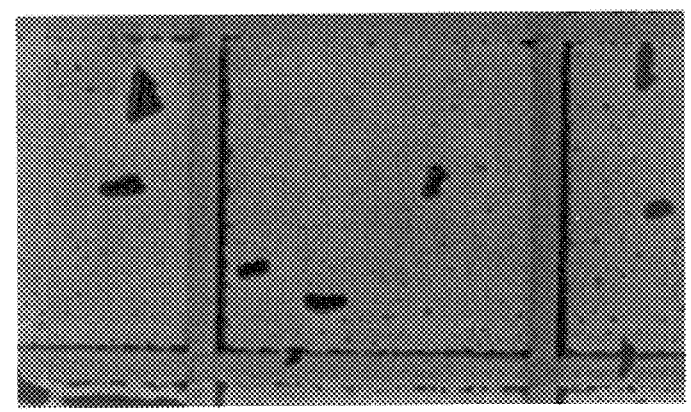

In FIG. 4, microphotographs taken through a pair of crossed polarizers (45° with rubbing direction) are shown for 'up' and 'down' states of the inventive device when a holding voltage VH (2.1 volts) is applied. FIG. 4 (a) shows the picture for the 'up' state of the device 5 seconds after a short pulse (7 ms) of +VH (effective voltage of 2 VH volts) was applied. FIG. 4 (b) shows the picture for the 'down' state of the inventive device 5 seconds after a short pulse (25 ms) of −VH (effective voltage zero volts) was applied. No stripes were observed.

Figure 5:
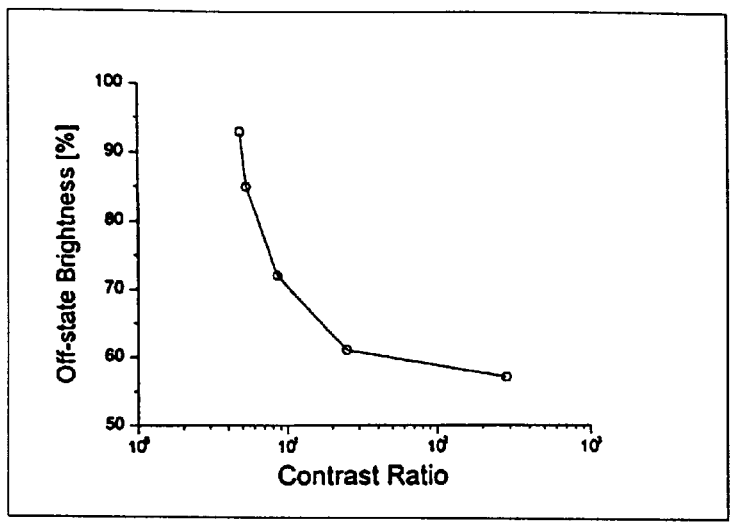
FIG. 5 is a graphical representation of the off-state brightness versus contrast ratio for different polarizers settings.

This embodiment of the inventive device had a yellowish appearance when placed between crossed polarizers. The delta-nd value for this device is 0.903 microns. It has a high brightness with an acceptable contrast ratio. The optimization for brightness and contrast ratio was performed by rotating the sample in-between a pair of crossed polarizers. The contrast ratio for the two states is 5:1 when the crossed polarizers positions (45° with cell rubbing direction) were optimized for brightness (93% transmittance at off-state), 286:1 when the crossed polarizers positions (parallel or perpendicular with cell rubbing direction) were optimized for maximum contrast ratio (57% transmittance at off-state). An off-state brightness (green 550 nm filter was used) versus the contrast ratio curve for various polarizers settings is shown in FIG. 5. (100% transmission corresponds to the transmission of an empty LCD with parallel polarizers attached.)

To demonstrate the use of the device of the present invention for a black and white display, a procedure of optimizing for the brightness by varying Δnd values and polarizers angles was followed. A 50% transmittance brightness was obtained for white at (CEI-x,y)=(0.303, 0.330), with a head-on contrast ratio of 46:1. The optimized Δnd value was 0.643 μm with polarizer and analyzer angles at 85° and 175° respectively.

The inventive bistable liquid crystal display has advantages over prior bistable liquid crystal displays. It uses the standard rubbed polyimide as alignment layers and has very low driving voltage, on the same order as STN devices which enable the use of commercially available, low-cost STN driver chips. Its low power consumption and fast-switching makes it a very good candidate for a page-size viewer.

Thus, the objects of the invention are accomplished by the present invention, which is not limited to the specific embodiments described above, but which includes variations modifications and equivalent embodiments defined by the following claims.

What is claimed is:

1. A liquid crystal display device including a polyimide alignment layer, having a bistable liquid crystal material and a polymer stabilizer in an amount effective to stabilize the liquid crystal associated with the liquid crystal material, and wherein the liquid crystal has a low pretilt angle.

2. The liquid crystal display device of claim 1 wherein the polymer stabilizer stabilizes the state of the liquid crystal in the absence of an applied field, and permits the liquid crystal to change states in the presence of an applied field.

3. The liquid crystal display device of claim 1 wherein the polymer stabilizer is present in an amount of from about 1% to about 5% based on the total weight of polymer and liquid crystal material.

4. The liquid crystal display device of claim 1 wherein the liquid crystal material is a chiral nematic liquid crystal, including chiral material in an amount effective to form a twist angle of 360°.

5. The liquid crystal display device of claim 4 having a cell thickness to pitch ratio of greater than or equal to about 0.75 to less than or equal to about 1.25.

6. The liquid crystal display device of claim 5 having a thickness to pitch ratio of about 0.88.

7. The liquid crystal display device of claim 1 wherein the surface pretilt angle is about 5°.

8. The liquid crystal display device of claim 1 wherein the polyimide alignment layers are antiparallelly rubbed on opposing substrates.

9. The liquid crystal display device of claim 8, wherein the substrates are transparent substrates selected from the group consisting of glass and plastic.

10. The liquid crystal display device of claim 1, wherein the polymer stabilizer is a polymerizable monomer that dissolves into and is aligned with the liquid crystal.

11. The liquid crystal display device of claim 1, wherein the polymer stabilizer is a UV curable acrylate.

12. The liquid crystal display device of claim 11, wherein the acrylate is a diacrylate.

* * * * *